(12) United States Patent
Kabir

(10) Patent No.: US 7,063,004 B1
(45) Date of Patent: Jun. 20, 2006

(54) PISTON ASSEMBLY

(75) Inventor: Omar M. Kabir, Waller, TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 10/905,137

(22) Filed: Dec. 17, 2004

(51) Int. Cl.
*F16L 1/00* (2006.01)
(52) U.S. Cl. .......................................... 92/128; 92/255
(58) Field of Classification Search ................. 92/128, 92/172, 255, 258
See application file for complete search history.

(56) References Cited

U.S. PATENT DOCUMENTS

| | | | | |
|---|---|---|---|---|
| 48,692 A | * | 7/1865 | Kendall | 92/258 |
| 3,149,543 A | * | 9/1964 | Naab | 92/258 |
| 3,807,285 A | * | 4/1974 | Phillips | 92/255 |
| 3,808,956 A | * | 5/1974 | Knapp | 92/172 |
| 3,868,192 A | * | 2/1975 | Pennington et al. | 92/172 |
| 3,951,048 A | * | 4/1976 | Bloom et al. | 92/258 |
| 4,630,958 A | * | 12/1986 | McCallister | 92/128 |
| 5,586,483 A | * | 12/1996 | Sine | 92/255 |
| 5,878,652 A | * | 3/1999 | Kottke | 92/258 |
| 6,817,278 B1 | * | 11/2004 | Hennemann et al. | 92/255 |

* cited by examiner

*Primary Examiner*—Thomas E. Lazo
(74) *Attorney, Agent, or Firm*—Conley Rose, P. C.

(57) ABSTRACT

Apparatus and methods for assembling a piston assembly that comprises a piston comprising a head end flange and a crank end flange and a rod having a head end shoulder and a crank end shoulder. The head end shoulder of the rod contacts the head end flange of the piston and the crank end shoulder of the rod contacts the crank end flange of the piston. A nut engages the rod such that the head end flange of the piston is disposed between the nut and the head end shoulder of said rod. A collar engages the piston such that the crank end shoulder of the rod is disposed between the collar and the crank end flange of the piston.

21 Claims, 4 Drawing Sheets

PISTON ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to methods and apparatus for piston assemblies. More particularly, the present invention relates to single piece pistons for use in reciprocating compressors.

In a reciprocating compressor, the piston sealingly engages a cylinder to form a sealed volume, the size of which changes with the position of the piston. As the piston moves in a first direction, the size of the sealed volume increases and fluid is drawn into the cylinder. As the piston moves in the opposite direction, the size of the sealed volume is decreased and the fluid within the cylinder is compressed. The movement of the piston alternates so as to provide a source of pressurized fluid.

The movement of the piston is controlled through to a rod connects the piston to a reciprocating engine or other power source. In most applications, the mass of the piston and rod at least partially limit the maximum speed at which the piston moves. Because the speed of the piston directly controls the performance of the compressor, it is often desirable to minimize the mass of the piston so as to maximize the speed at which the piston can travel.

Many larger diameter piston assemblies include several component pieces that are assembled together and held in place by attachment to the rod. The attachment of the piston to the rod may pre-stress the rod to the extent that the load capability of the rod is reduced. Further, many multiple piece piston assemblies include components constructed from different materials selected so as to reduce the overall weight of the assembly. The multiple materials and multiple components further add to the complexity of the piston and rod assembly.

Thus, there remains a need to develop methods and apparatus for piston assemblies, which overcome some of the foregoing difficulties while providing more advantageous overall results.

SUMMARY OF THE PREFERRED EMBODIMENTS

The embodiments of the present invention are directed toward apparatus and methods for assembling a piston assembly that comprises a piston comprising a head end flange and a crank end flange and a rod having a head end shoulder and a crank end shoulder. The head end shoulder of the rod contacts the head end flange of the piston and the crank end shoulder of the rod contacts the crank end flange of the piston. A nut engages the rod such that the head end flange of the piston is disposed between the nut and the head end shoulder of the rod. A collar engages the piston such that the crank end shoulder of the rod is disposed between the collar and the crank end flange of the piston.

In certain embodiments, the piston further comprises a cavity within the piston and a hole through the piston that provides access to the cavity. The hole may be disposed within a groove formed circumferentially about the piston. The piston may also comprise a first aperture through the crank end flange and a second aperture through the head end flange, wherein the first and second apertures are aligned and sized such that the head end shoulder of the rod passes through the second aperture but not the first aperture. In some embodiments, the nut threadedly engages the rod and the collar threadedly engages the piston. The piston may be a unitary body and constructed from a single casting.

Methods for assembling a piston assembly may comprise inserting a rod through a head end flange and a crank end flange of a piston, capturing the head end flange of the piston between a nut engaged with the rod and a head end shoulder disposed on the rod, and capturing a crank end shoulder of the rod between the crank end flange of the piston and a collar engaged with the piston.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
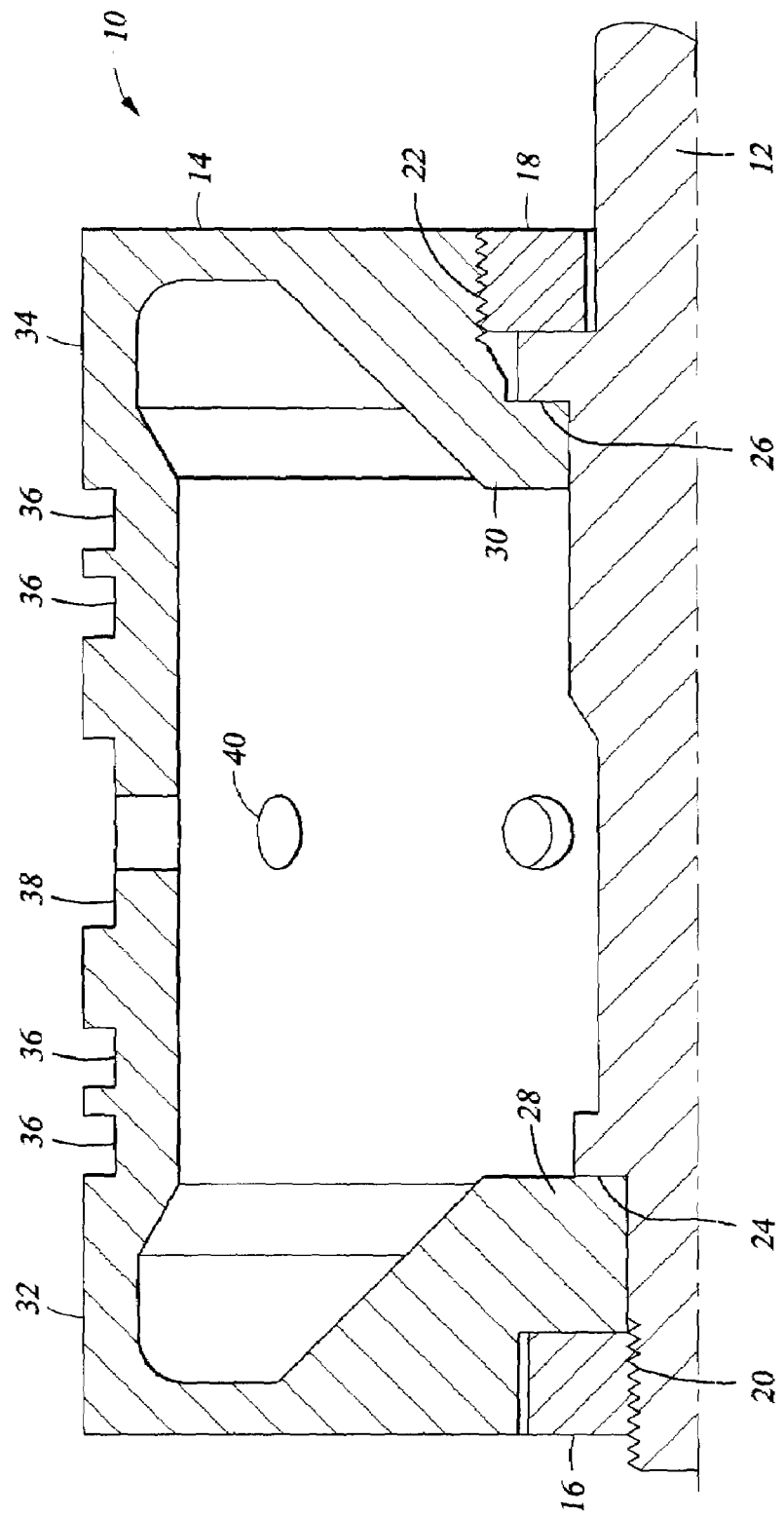
FIG. 1 is a cross-sectional view of a piston assembly constructed in accordance with embodiments of the current invention.

Referring now to FIG. 1, piston assembly 10 comprises rod 12 and piston 14. Piston 14 is coupled to rod 12 via threaded nuts 16 and 18. Rod 12 further comprises threaded end 20, head end shoulder 24, and crank end shoulder 26. Piston 14 comprises a unitary hollow body 32, a head end flange 28, and crank end flange 30. Threads 22 are disposed on an inner surface of second flange 30. Outer surface 34 of piston 14 comprises sealing grooves 36 and rider ring groove 38.

Clean-out holes 40 are located in the bottom of rider ring groove 38 and provide access to the inside of body 32. Clean-out holes 40 provide access to the inside of body 32 that aid in the construction of piston 14 from a single casting. Piston 14 may be constructed from cast metal, such as steel, or any other material as may be desired.

Piston 14 is assembled onto rod 12 by inserting rod through flange 30 where shoulder 24 will pass through flange 30 but contacts flange 28. Threaded nut 16 is tightened to engage threads 20 on the outside surface of rod 12 and urge flange 30 against, or close to, shoulder 26.

Threaded nut 18 is tightened to engage threads 22 on an inner surface of piston 14 and capture flange 30 against shoulder 26.

Figure 2:
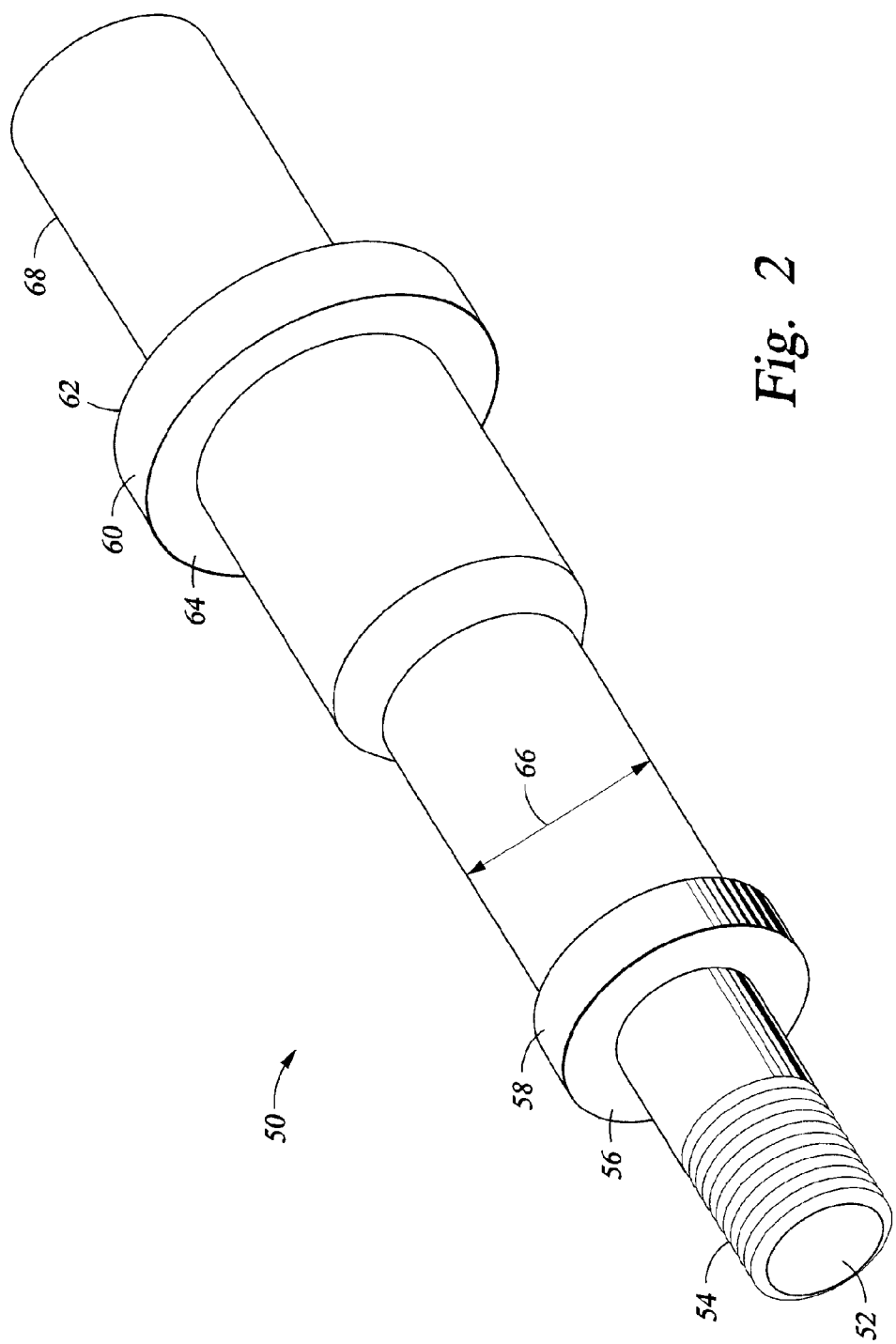
FIG. 2 is a isometric view of a rod constructed in accordance with embodiments of the current invention.

Referring now to FIG. 2, one embodiment of rod 50 comprises head end 52, head end shoulder 58, and crank end shoulder 60. Head end shoulder 58 has a smaller diameter than crank end shoulder 60. Head end shoulder 58 has a face 56 that is oriented toward head end 52. Crank end flange 60 comprises face 64 that is oriented toward head end 52 and opposite face 62 that is oriented toward crank end 68. The diameter 66 of rod 50 between head end shoulder 58 and crank end shoulder 60 may be reduced so as to be less than the diameter of head end shoulder 58. Rod 50 is preferably constructed from a single piece of solid material, such as a forged bar.

Figure 3:
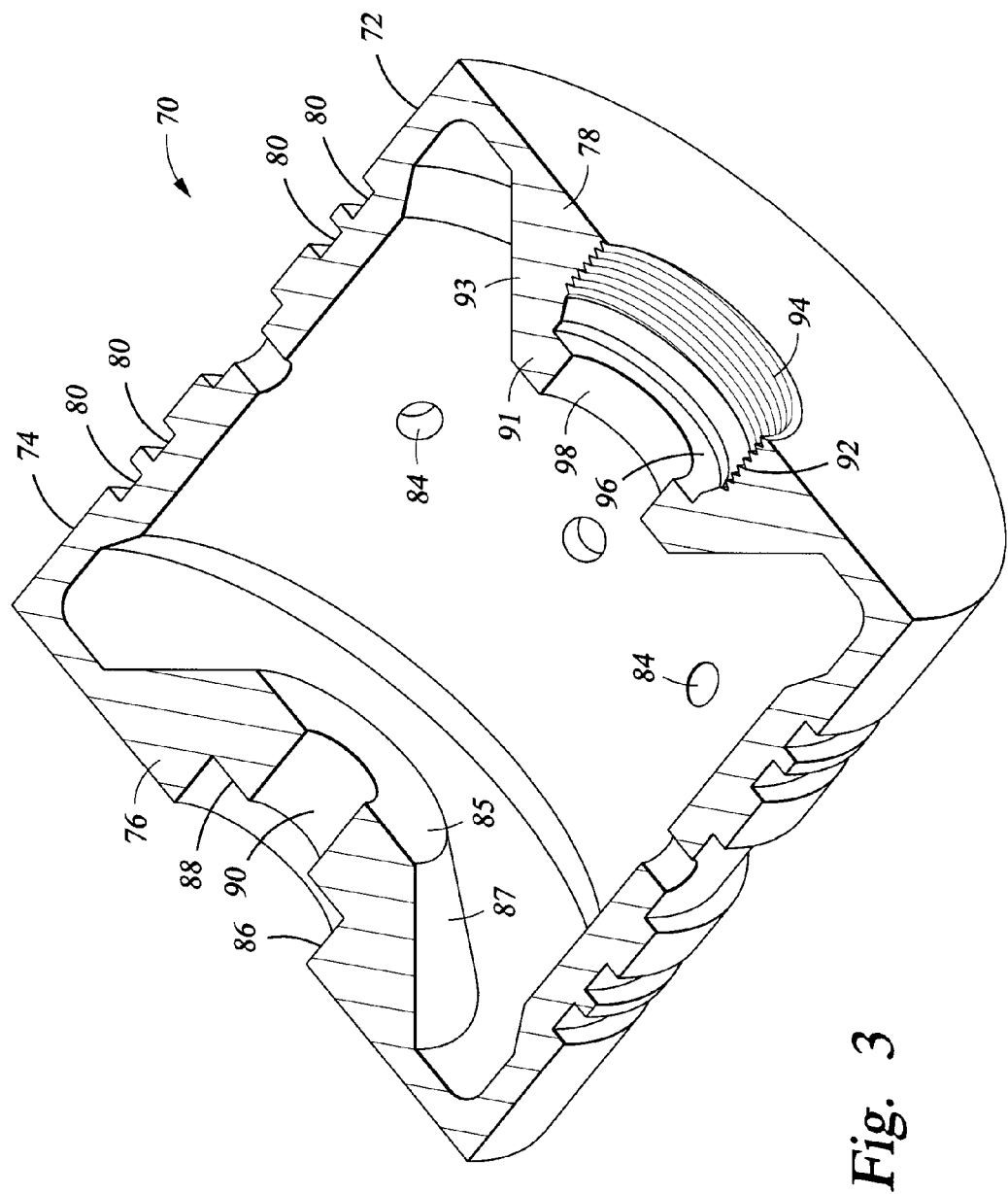
FIG. 3 is a cross-sectional isometric view of a piston constructed in accordance with embodiments of the current invention.

Referring now to FIG. 3, one embodiment of piston 70 comprises body 72 having an outer cylindrical surface 74, a head end flange 76, and a crank end flange 78. Outer cylindrical surface comprises sealing grooves 80, rider ring groove 82, and access holes 84. It is understood that different configurations of grooves and holes are possible and that the configuration show is only for purposed of example. Access holes 84 provide access to the interior of body 72 during fabrication and further reduce the mass of the body.

Head end flange 76 projects inward from one end of body 72 and comprises center portion 85. Center portion 85 further comprises recess 86, the bottom of which is defined by annular shoulder 88 surrounding aperture 90. Center portion 85 is supported by a continuous conical extension 87 of head end flange 76. In certain embodiments, as an alternative to continuous conical extension 87, one or more ribs may support head end flange 76 so as to further reduce the mass of piston 70.

Crank end flange 78 projects inward on the other end of body 72 and comprises center portion 91. Center portion 91 comprises recess 92 having threaded portion 94. The bottom of recess 92 is defined by annular shoulder 96 surrounding aperture 98. Center portion 91 is supported by a continuous conical extension 93 of crank end flange 78. In certain embodiments, as an alternative to continuous conical extension 93, one or more ribs may support head end flange 78 so as to further reduce the mass of piston 70.

Figure 4:
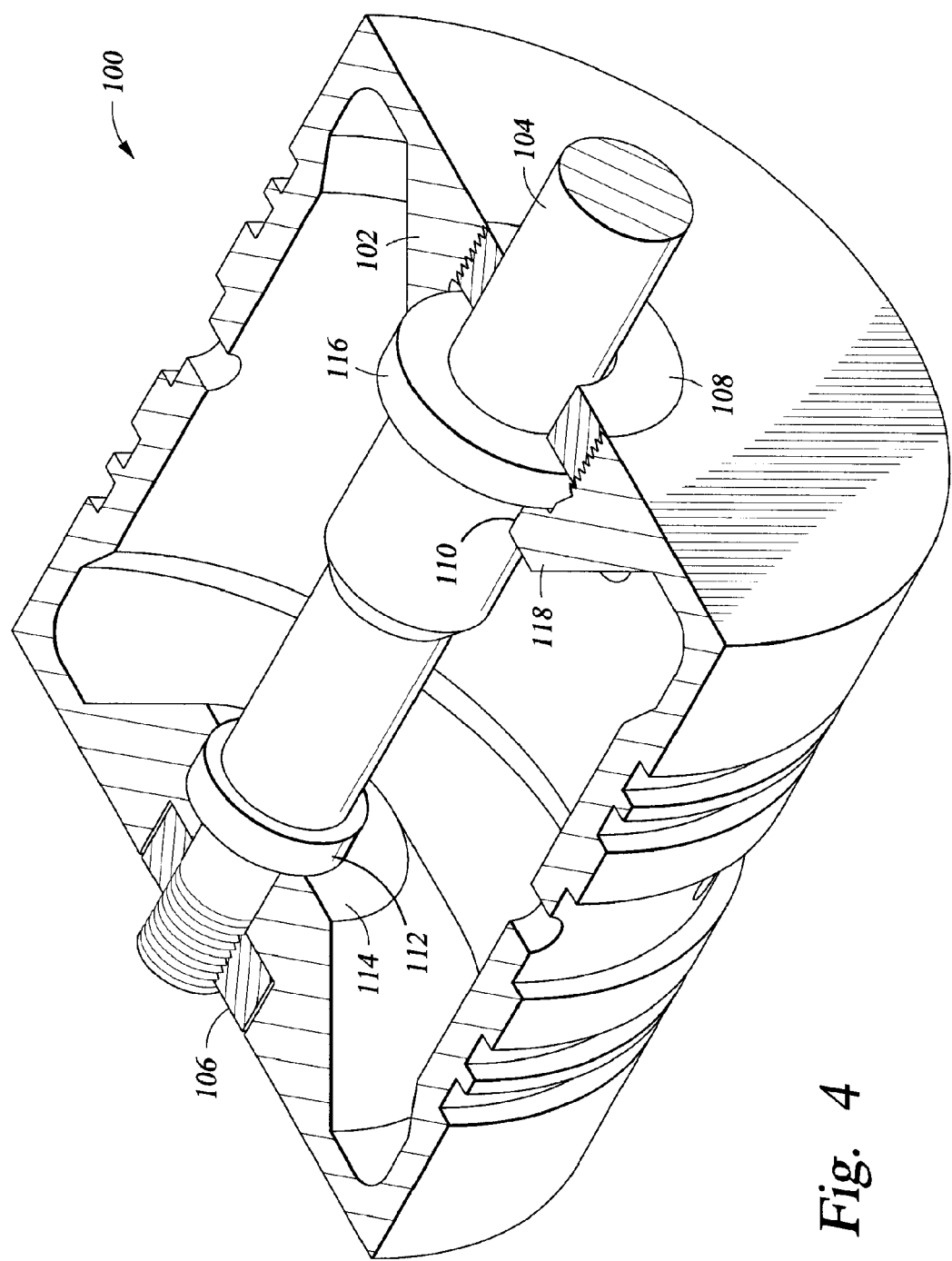
FIG. 4 is a cross-sectional isometric view of a piston assembly constructed in accordance with embodiments of the present invention.

Referring now to FIG. 4, piston assembly 100 comprises piston 102, rod 104, head end nut 106, and crank end nut 108. Piston 102 is assembled onto rod 104 by inserting the rod through aperture 110 until shoulder 112 of the rod contacts surface 114 of the piston. Head end nut 106 threadedly engages rod 104 and draws shoulder 112 into secure contact with surface 114. Crank end nut 108 is threadedly engaged with piston 102 so to securely capture flange 118 against shoulder 116 of the rod contact surface of 110. Therefore, piston 102 is securely attached to rod 104 without imparting an excessive preload onto the rod.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the piston apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A piston assembly comprising:
   a piston comprising a head end flange and a crank end flange;
   a rod having a head end shoulder and a crank end shoulder, wherein the head end shoulder of said rod contacts the head end flange of said piston and the crank end shoulder of said rod contacts the crank end flange of said piston;
   a nut engaged with said rod, wherein the head end flange of said piston is disposed between said nut and the head end shoulder of said rod; and
   a collar engaged with said piston, wherein the crank end shoulder of said rod is disposed between said collar and the crank end flange of said piston.

2. The piston assembly of claim 1 wherein said piston further comprises:
   a cavity within said piston; and
   a hole through said piston that provides access to said cavity.

3. The piston assembly of claim 2 wherein said hole is disposed within a groove formed circumferentially about said piston.

4. The piston assembly of claim 1 wherein said piston further comprises a first aperture through the crank end flange and a second aperture through the head end flange, wherein said first and second apertures are aligned and sized such that the head end shoulder of said rod passes through the second aperture but not the first aperture.

5. The piston assembly of claim 1 wherein said nut threadedly engages said rod.

6. The piston assembly of claim 1 wherein said collar threadedly engages said piston.

7. The piston assembly of claim 1 wherein said piston is a unitary body.

8. The piston assembly of claim 1 wherein said piston is constructed from a single casting.

9. A piston assembly method comprising:
   inserting a rod through a head end flange and a crank end flange of a piston;
   capturing the head end flange of the piston between a nut engaged with the rod and a head end shoulder disposed on the rod; and
   capturing a crank end shoulder of the rod between the crank end flange of the piston and a collar engaged with the piston.

10. The method of claim 9 wherein the nut threadedly engages the rod.

11. The method of claim 9 wherein the collar threadedly engages the piston.

12. The method of claim 9 wherein the piston is a unitary body.

13. The method of claim 9 wherein the piston is constructed from a single casting.

14. A piston assembly comprising:
   a rod having a first shoulder and a second shoulder, wherein the first shoulder has a smaller diameter than the second shoulder;
   a first flange disposed against the first shoulder;
   a second flange disposed against the second shoulder;
   a cylindrical body connected to said first flange and said second flange;
   a nut engaged with said rod and disposed adjacent to said first flange; and a collar engaged with said second flange and disposed adjacent to the second shoulder of said rod.

15. The piston assembly of claim 14 further comprising a cavity defined by said cylindrical body, said first flange, and said second flange.

16. The piston assembly of claim 15 further comprising one or more holes through said cylindrical body that provide access to said cavity.

17. The piston assembly of claim 16 wherein said one or more holes are disposed within a groove formed circumferentially about cylindrical body.

18. The piston assembly of claim 14 wherein said nut threadedly engages said rod.

19. The piston assembly of claim 14 wherein said collar threadedly engages said second flange.

20. The piston assembly of claim 14 wherein said cylindrical body, said first flange, and said second flange form a unitary body.

21. The piston assembly of claim 20 wherein the unitary body is constructed from a single casting.

\* \* \* \* \*